US012674738B2

(12) United States Patent
Okamoto et al.

(10) Patent No.: US 12,674,738 B2
(45) Date of Patent: Jul. 7, 2026

(54) FLOW CYTOMETER OBSERVATION CHIP

(71) Applicant: SEIKO EPSON CORPORATION,
Tokyo (JP)

(72) Inventors: Junichi Okamoto, Shiojiri (JP);
Tatsunori Miyazawa, Shiojiri (JP);
Keigo Yamasaki, Shiojiri (JP)

(73) Assignee: SEIKO EPSON CORPORATION,
Tokyo (JP)

( * ) Notice: Subject to any disclaimer, the term of this
patent is extended or adjusted under 35
U.S.C. 154(b) by 203 days.

(21) Appl. No.: 18/603,244

(22) Filed: Mar. 13, 2024

(65) Prior Publication Data

US 2024/0310268 A1      Sep. 19, 2024

(30) Foreign Application Priority Data

Mar. 14, 2023     (JP) ................................. 2023-039902

(51) Int. Cl.
*G01N 15/10*          (2024.01)
*G01N 15/1404*          (2024.01)
*G01N 15/1434*          (2024.01)
(52) U.S. Cl.
CPC . *G01N 15/1404* (2013.01); *G01N 2015/1006*
(2013.01)
(58) Field of Classification Search
CPC .................. G01N 35/02; G01N 37/00; G01N
2035/00158; G01N 2035/00277;
(Continued)

(56) References Cited

U.S. PATENT DOCUMENTS

| | | | | |
|---|---|---|---|---|
| 6,674,525 B2 * | 1/2004 | Bardell | ............... | F16K 99/0015 |
| | | | | 422/417 |
| 10,900,885 B2 * | 1/2021 | Yamamoto | ........ | B01L 3/502761 |

(Continued)

FOREIGN PATENT DOCUMENTS

| | | | | |
|---|---|---|---|---|
| EP | 3152294 B1 * | 3/2021 | ......... | G01N 15/1459 |
| WO | WO-2004008142 A1 * | 1/2004 | .......... | B01F 25/4338 |

(Continued)

OTHER PUBLICATIONS

Shinya Sakuma et al., "On-chip cell sorting by high-speed local-flow control using dual membrane pumps", Lab on a Chip, Aug. 1, 2017, pp. 2760-2767.

*Primary Examiner* — Andre J Allen
(74) *Attorney, Agent, or Firm* — JCIPRNET

(57) ABSTRACT

An observation chip 1 includes: a plurality of substrates 10 stacked in a thickness direction Z of the substrates; a first channel 25 extending along a first axis O1 along the substrates; a surrounding channel 30 surrounding the first channel all around in a cross section orthogonal to the first axis in the first channel from an end of the first channel to an overall merging point P2 of the first channel, integrated with the first channel, and forming a second channel 55 that extends along a second axis O2 along the substrates; and an observation section 60 provided on a side farther away from the first channel than the overall merging point in the second channel, and transmitting electromagnetic waves from outside to the second channel. A length of the second channel in the thickness direction is constant from the overall merging point to the observation section.

6 Claims, 6 Drawing Sheets

(58) Field of Classification Search
CPC ....... G01N 33/48707; G01N 35/00029; G01N
33/48; G01N 33/50; G01N 15/1404;
G01N 2015/1006; G01N 30/0005; G01N
33/54366; G01N 15/1484; G01N 30/461;
G01N 30/466; G01N 30/6043; G01N
30/6065
See application file for complete search history.

(56) References Cited

U.S. PATENT DOCUMENTS

| | | | | |
|---|---|---|---|---|
| 11,137,336 | B2 * | 10/2021 | Barnes | .............. B01L 3/502761 |
| 11,874,224 | B2 * | 1/2024 | Yamamoto | ......... G02B 21/0076 |
| 12,038,370 | B2 * | 7/2024 | Ozcan | ................... F28F 25/082 |
| 12,259,311 | B2 * | 3/2025 | Ota | .................... G01N 15/1434 |
| 2018/0087100 | A1 * | 3/2018 | Otsuka | ................. C12Q 1/6837 |
| 2024/0310265 | A1 * | 9/2024 | Fradkin | .............. G01N 15/0227 |

FOREIGN PATENT DOCUMENTS

| | | | | |
|---|---|---|---|---|
| WO | WO-2025155756 | A1 * | 7/2025 | ............. G01N 33/49 |
| WO | WO-2025228660 | A1 * | 11/2025 | ........ B01L 3/502715 |

* cited by examiner

1

31A 33A   33A

41

42   43

B2

A4   A5

B3

10(17)
10(13)

B1

10(12)
10(11)
10(16)

A6

A7

25

A4

A5

B2

A6

S2   P1

B1

A7

30

P2

S1

B3

B1

55

O1
(O2)

Z2 Y1
Z
X1
Y          X2
Y2 Z1

C1      C1

25                    L11

L12   O1      S2

Z2
Z
Y2          Y1
Y
Z1   X1(X2)

FLOW CYTOMETER OBSERVATION CHIP

The present application is based on, and claims priority from JP Application Serial Number 2023-039902, filed Mar. 14, 2023, the disclosure of which is hereby incorporated by reference herein in its entirety.

BACKGROUND

1. Technical Field

The present disclosure relates to an observation chip.

2. Related Art

Flow cytometers are used to detect, count, and sort cells, particles, and the like. In a flow cytometer, a sample liquid (sample fluid) containing cells is introduced into an observation chip (sorting device) that has fine channels formed inside. Then, the characteristics of each cell are analyzed using laser light or the like, and the cells are sorted according to the analysis results.

A known configuration of the observation chip is made by sealing the upper and lower sides of a silicon substrate, which has a plurality of channels, with glass substrates, as described in Non-Patent Document 1 (The Royal Society of Chemistry 2017, "On-chip cell sorting by high-speed local-flow control using dual membrane pumps", Lab Chip, 2017, 17, 2760-2767), which is an example of the related art. In this observation chip, a channel for introducing a sheath liquid into a sample channel from above and below (vertical direction) and a channel for introducing a sheath liquid from left and right (horizontal direction) are formed.

However, when observing the sample fluid in the observation chip of Non-Patent Document 1, the flow of the sample fluid flowing through the observation chip may be disturbed, and the sample fluid may not be observed properly.

SUMMARY

In order to solve the above problems, the present disclosure proposes the following means.

(1) The first aspect of the present disclosure provides an observation chip, including: a plurality of substrates stacked in a thickness direction of the plurality of substrates; a first channel extending along a first axis along the plurality of substrates; a surrounding channel surrounding the first channel all around in a cross section orthogonal to the first axis in the first channel from an end of the first channel to an overall merging point of the first channel, integrated with the first channel, and forming a second channel that extends along a second axis along the plurality of substrates; and an observation section provided on a side farther away from the first channel than the overall merging point in the second channel, and transmitting electromagnetic waves from outside to the second channel. A length of the second channel in the thickness direction is constant from the overall merging point to the observation section.

DESCRIPTION OF EXEMPLARY EMBODIMENTS

Hereinafter, an embodiment of the observation chip according to the present disclosure will be described with reference to FIG. 1 to FIG. 12.

Figure 1:
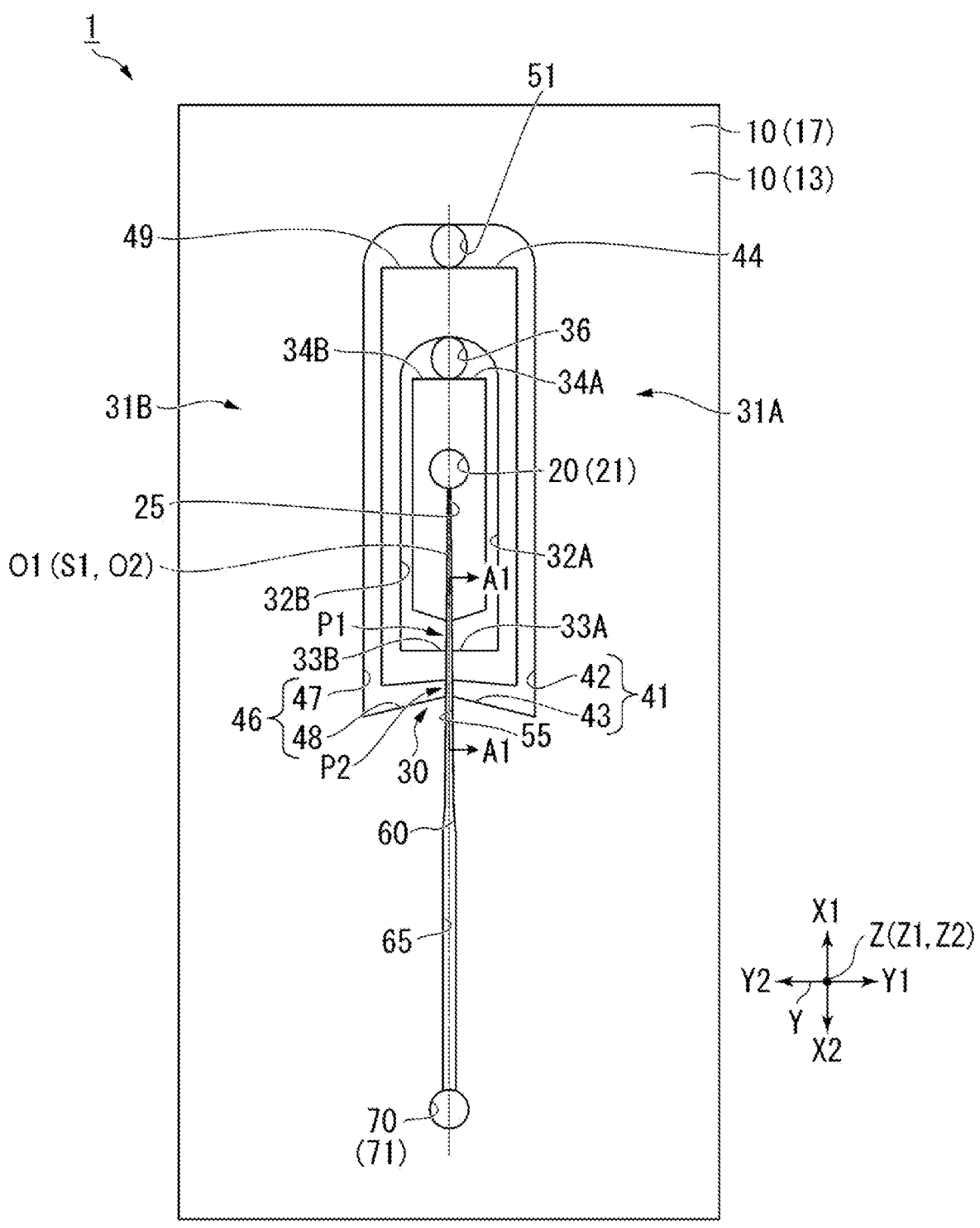
FIG. 1 is a plan view of an observation chip according to an embodiment of the present disclosure.
Figures 2, 3:
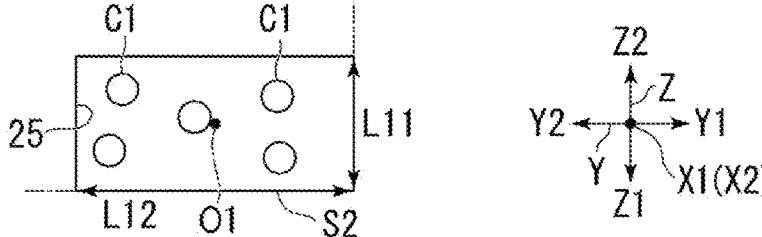
FIG. 2 is a perspective view taken along the cutting line A1-A1 in FIG. 1.
FIG. 3 is a cross-sectional view taken along the cutting line A4-A4 in FIG. 2.

As shown in FIG. 1 and FIG. 2, an observation chip 1 of this embodiment includes a plurality of substrates 10 stacked in a thickness direction Z of the plurality of substrates 10.

As shown in FIG. 2, for example, the plurality of substrates 10 include a channel substrate 11, a channel substrate 12, a channel substrate 13, a protective substrate 16, and a protective substrate 17. That is, the plurality of substrates 10 include three channel substrates 11, 12, and 13. For example, the channel substrates 11, 12, and 13 are formed in a rectangular shape that is long in a predetermined direction when viewed in the thickness direction Z. The channel substrates 11, 12, and 13 are made of metal such as stainless steel. The channel substrates 11, 12, and 13 may be made of resin having a Young's modulus of about 2 GPa (gigapascals), metal having a Young's modulus of about 70 GPa to 500 GPa, glass, ceramics, or the like.

For example, the thickness of the channel substrates 11, 12, and 13 is 0.1 mm or less.

Hereinafter, the side of the channel substrate 11 with respect to the channel substrate 12 is referred to as a first side Z1 in the thickness direction Z (also simply referred to as the first side Z1). The side of the channel substrate 13 with respect to the channel substrate 12 is referred to as a second side Z2 in the thickness direction Z (also simply referred to as the second side Z2). That is, the channel substrates 11, 12, and 13 are arranged in the order of the channel substrates 11, 12, and 13 from the first side Z1 toward the second side Z2. It should be noted that there is no limit to the number of channel substrates included in the observation chip 1, which may be one or two, or four or more.

The protective substrates 16 and 17 are made of transparent glass or the like and are formed to have the same external shape as the channel substrates 11, 12, and 13. The protective substrate 16 is arranged closer to the first side Z1 than the channel substrate 11. The protective substrate 17 is arranged closer to the second side Z2 than the channel substrate 13.

That is, the protective substrate 16, the channel substrate 11, the channel substrate 12, the channel substrate 13, and the protective substrate 17 are arranged in this order from the first side Z1 toward the second side Z2. The substrates 10 adjacent to each other in the thickness direction Z are bonded to each other by a known adhesive (not shown).

The channel substrates 11, 12, and 13 are each formed with a slit (reference numeral omitted) that penetrates in the thickness direction Z. By stacking the protective substrates 16 and 17 on the channel substrates 11, 12, and 13 that have slits, etc., as shown in FIG. 1 and FIG. 2, the plurality of substrates 10 include a sample fluid supply section 20, a first channel 25, a surrounding channel 30, a second channel 55, an observation section 60, a third channel 65, and a separation section 70.

As shown in FIG. 1, the sample fluid supply section 20 is formed in a columnar shape. For example, the sample fluid supply section 20 is formed in the channel substrate 12. An opening 21 communicates with the sample fluid supply section 20. For example, the opening 21 is formed in the channel substrate 13 and the protective substrate 17.

Here, as shown in FIG. 1 and FIG. 2, a first axis O1 is defined along the plurality of substrates 10 and along a predetermined direction. A reference plane S1 that includes the first axis O1 and extends along the thickness direction Z is defined. A cross section S2 orthogonal to the first axis O1 is defined (see FIG. 2). A direction orthogonal to the first axis O1 and the thickness direction Z respectively is defined as an orthogonal direction (first orthogonal direction) Y.

The first channel 25 extends from the sample fluid supply section 20 along the first axis O1. As shown in FIG. 3, the cross-sectional shape of the first channel 25 along the cross section S2 (hereinafter referred to as a first channel cross-sectional shape) is rectangular. The cross-sectional shapes of the first channel 25, etc. in FIG. 3 and subsequent drawings show a schematic configuration. For example, the first channel 25 is formed in the channel substrate 12.

As shown in FIG. 1 and FIG. 2, the side of the sample fluid supply section 20 with respect to the first channel 25 along the first axis O1 is defined as an upstream side X1. The side of the first channel 25 with respect to the sample fluid supply section 20 along the first axis O1 is defined as a downstream side X2. The sample fluid supply section 20 is provided at an end of the first channel 25 on the upstream side X1.

As shown in FIG. 1 and FIG. 2, the surrounding channel 30 includes a pair of first branch channels 31A and 31B and a pair of second branch channels 41 and 46.

In this embodiment, the configuration of the first branch channel 31A and the configuration of the first branch channel 31B are plane symmetrical with respect to the first reference plane S1. Therefore, the configuration of the first branch channel 31A is indicated by adding a capital letter "A" to the number of the reference numeral. The configuration of the first branch channel 31B, which corresponds to the first branch channel 31A, is indicated by adding a capital letter "B" to the same number as the first branch channel 31A. Thus, redundant description will be omitted. For example, a straight portion 32A of the first branch channel 31A, which will be described later, and a straight portion 32B of the first branch channel 31B are plane symmetrical with respect to the first reference plane S1.

The first branch channel 31A includes the straight portion 32A, a bent portion 33A, and a bent portion 34A.

The straight portion 32A extends along the first axis O1. The straight portion 32A is arranged at a position spaced apart from the first channel 25 on a first side Y1 in an orthogonal direction Y orthogonal to the first channel 25 (hereinafter also simply referred to as the first side Y1).

The bent portion 33A protrudes from an end of the straight portion 32A on the downstream side X2 toward a second side Y2 opposite to the first side Y1 in the orthogonal direction Y (hereinafter also simply referred to as the second side Y2). An end of the bent portion 33A on the second side Y2 is continuous from the first side Y1 of the first channel 25 to the first channel 25 at a partial merging point P1 in the first channel 25.

As shown in FIG. 1, the bent portion 34A protrudes from an end of the straight portion 32A on the upstream side X1 toward the second side Y2 and onto the first axis O1.

The first branch channel 31B includes the straight portion 32B, a bent portion 33B, and a bent portion 34B, which are configured in the same manner as the straight portion 32A, the bent portion 33A, and the bent portion 34A of the first branch channel 31A.

The straight portion 32B is arranged at a position spaced apart from the first channel 25 on the second side Y2 with respect to the first channel 25. An end of the bent portion 33B on the first side Y1 is continuous from the second side Y2 of the first channel 25 to the first channel 25 at the partial merging point P1 in the first channel 25.

The bent portion 34B communicates with the bent portion 34A.

As described above, the first branch channels 31A and 31B sandwich the first channel 25 in the orthogonal direction Y at the partial merging point P1 of the first channel 25.

Figure 4:
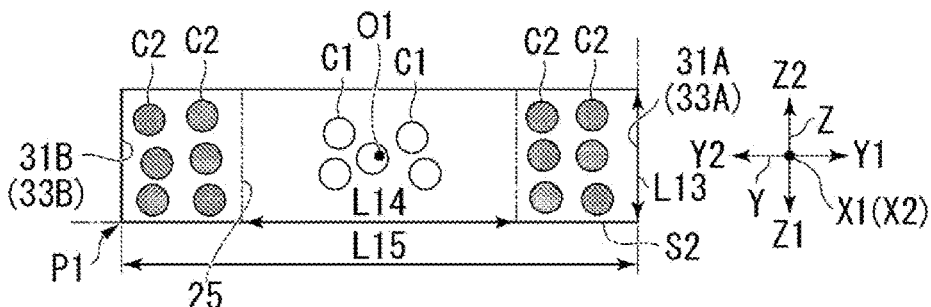
FIG. 4 is a cross-sectional view taken along the cutting line A5-A5 in FIG. 2.

As shown in FIG. 4, the cross-sectional shape of the first channel 25 and the first branch channels 31A and 31B along the cross section S2 at the partial merging point P1 (hereinafter referred to as a partial merging point cross-sectional shape) is rectangular.

A length L13 of the partial merging point cross-sectional shape in the thickness direction Z is equal to a length L11 of the first channel cross-sectional shape in the thickness direction Z (see FIG. 3). A length L14 of the first channel 25 in the orthogonal direction Y at the partial merging point P1 is substantially the same as a length L12 of the first channel cross-sectional shape in the orthogonal direction Y (see FIG. 3). A length L15 of the partial merging point cross-sectional shape in the orthogonal direction Y is longer than a length L12 of the first channel cross-sectional shape in the orthogonal direction Y.

For example, the first branch channels 31A and 31B are formed in the channel substrate 12.

As shown in FIG. 1, the first branch channels 31A and 31B are plane symmetrical with respect to the first reference plane S1.

For example, an opening 36 communicates with the portions of the bent portions 34A and 34B that communicate with each other. For example, the opening 36 is formed in the channel substrate 13 and the protective substrate 17.

For example, the first branch channels 31A and 31B are formed in the channel substrate 12.

As shown in FIG. 1 and FIG. 2, the second branch channel 41 includes a straight portion 42, a bent portion 43, and a bent portion 44.

The straight portion 42 extends along the first axis O1. The straight portion 42 is arranged at a position spaced apart from the straight portion 32A on the first side Y1 with respect to the straight portion 32A of the first branch channel 31A.

The bent portion 43 protrudes from an end of the straight portion 42 on the downstream side X2 toward the direction between the second side Y2 and the upstream side X1. An end of the bent portion 43 on the second side Y2 is continuous from the second side Z2 of the first channel 25 to the first channel 25 at an overall merging point P2 in the first channel 25. The overall merging point P2 is located on the downstream side X2 (on the side of the second channel 55) of the partial merging point P1 in the first channel 25. In other words, the partial merging point P1 is located on the side farther away from the second channel 55 than the overall merging point P2 in the first channel 25.

As shown in FIG. 1, the bent portion 44 protrudes from an end of the straight portion 42 on the upstream side X1 toward the second side Y2 and onto the first axis O1. The bent portion 44 is arranged closer to the first side Y1 than the bent portion 34A of the first branch channel 31A.

For example, the straight portion 42 and the bent portion 43 are formed in the channel substrate 13, and the bent portion 44 is formed in the channel substrate 12.

The second branch channel 46 includes a straight portion 47, a bent portion 48, and a bent portion 49, which are configured in the same manner as the straight portion 42, the bent portion 43, and the bent portion 44 of the second branch channel 41.

The straight portion 47 extends along the first axis O1. The straight portion 47 is arranged at a position spaced apart from the straight portion 32B on the second side Y2 with respect to the straight portion 32B.

The bent portion 48 protrudes from an end of the straight portion 47 on the downstream side X2 toward the direction between the first side Y1 and the upstream side X1. An end of the bent portion 48 on the first side Y1 is continuous from the first side Z1 of the first channel 25 to the first channel 25 at the overall merging point P2 in the first channel 25.

The bent portion 49 protrudes from an end of the straight portion 47 on the upstream side X1 toward the first side Y1 and communicates with the bent portion 44.

The second branch channels 41 and 46 may be plane symmetrical with respect to the reference plane S1.

As described above, the second branch channels 41 and 46 sandwich the first channel 25 in the thickness direction Z at the overall merging point P2 of the first channel 25. The first branch channels 31A and 31B and the second branch channels 41 and 46 of the surrounding channel 30 surround the first channel 25 all around in the cross section S2 of the first channel 25 from the end of the first channel 25 on the upstream side X1 to the overall merging point P2 of the first channel 25. Then, the first branch channels 31A and 31B and the second branch channels 41 and 46 are integrated with the first channel 25 and form the second channel 55 that extends along a second axis O2 along the plurality of substrates 10.

In this embodiment, the second axis O2 coincides with the first axis O1. It should be noted that the second axis O2 may intersect the first axis O1 on a plane along the plurality of substrates 10.

In this embodiment, a second orthogonal direction that is orthogonal to the second axis O2 and the thickness direction Z respectively is parallel to the orthogonal direction Y. It should be noted that the second orthogonal direction may intersect the orthogonal direction Y.

Figure 5:
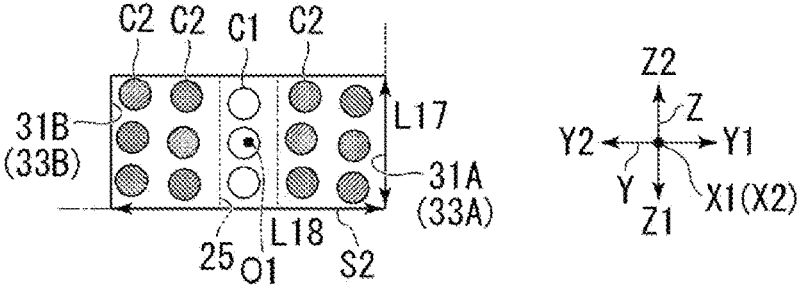
FIG. 5 is a cross-sectional view taken along the cutting line A6-A6 in FIG. 2.

As shown in FIG. 5, the cross-sectional shape of the first channel 25 and the first branch channels 31A and 31B along the cross section S2 at an intermediate portion between the partial merging point P1 and the overall merging point P2 (hereinafter referred to as a first channel intermediate portion cross-sectional shape) is rectangular. A length L17 of the first channel intermediate portion cross-sectional shape in the thickness direction Z is equal to the length L13 of the partial merging point cross-sectional shape in the thickness direction Z. A length L18 of the first channel intermediate portion cross-sectional shape in the orthogonal direction Y is shorter than the length L15 of the partial merging point cross-sectional shape in the orthogonal direction Y, and is substantially the same as the length L12 of the first channel cross-sectional shape in the orthogonal direction Y. That is, the length L18 of the first channel 25 and the first branch channels 31A and 31B in the orthogonal direction Y at the intermediate portion between the partial merging point P1 and the overall merging point P2 is shorter than the length L15 of the first channel 25 and the first branch channels 31A and 31B in the orthogonal direction Y at the partial merging point P1.

It should be noted that the length L18 of the first channel 25 and the first branch channels 31A and 31B in the orthogonal direction Y at the intermediate portion between the partial merging point P1 and the overall merging point P2 may be equal to the length L15 of the first channel 25 and the first branch channels 31A and 31B in the orthogonal direction Y at the partial merging point P1.

Figure 6:
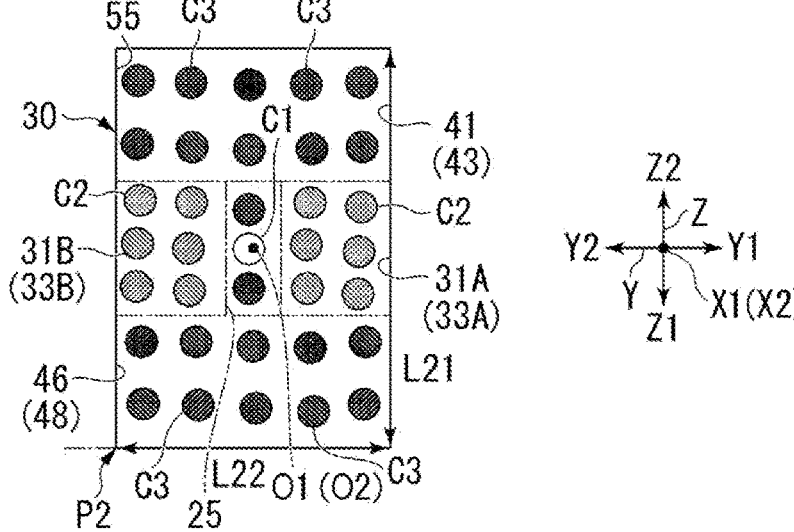
FIG. 6 is a cross-sectional view taken along the cutting line A7-A7 in FIG. 2.

As shown in FIG. 6, the cross-sectional shape at the overall merging point P2 of the second channel 55 along a cross section orthogonal to the second axis O2 (hereinafter referred to as an overall merging point cross-sectional shape) is rectangular. A length L21 of the overall merging point cross-sectional shape in the thickness direction Z is longer than the length L17 of the first channel intermediate portion cross-sectional shape in the thickness direction Z. A length L22 of the overall merging point cross-sectional shape in the orthogonal direction Y is equivalent to the length L18 of the first channel intermediate portion cross-sectional shape in the orthogonal direction Y.

As shown in FIG. 1, for example, an opening 51 communicates with the portions of the bent portions 44 and 49 that communicate with each other. For example, the opening 51 is formed in the channel substrate 13 and the protective substrate 17.

The observation section 60 is formed at an end of the second channel 55 on the downstream side X2. In other words, the observation section 60 is provided on the side farther away from the first channel 25 than the overall merging point P2 in the second channel 55.

Figure 7:
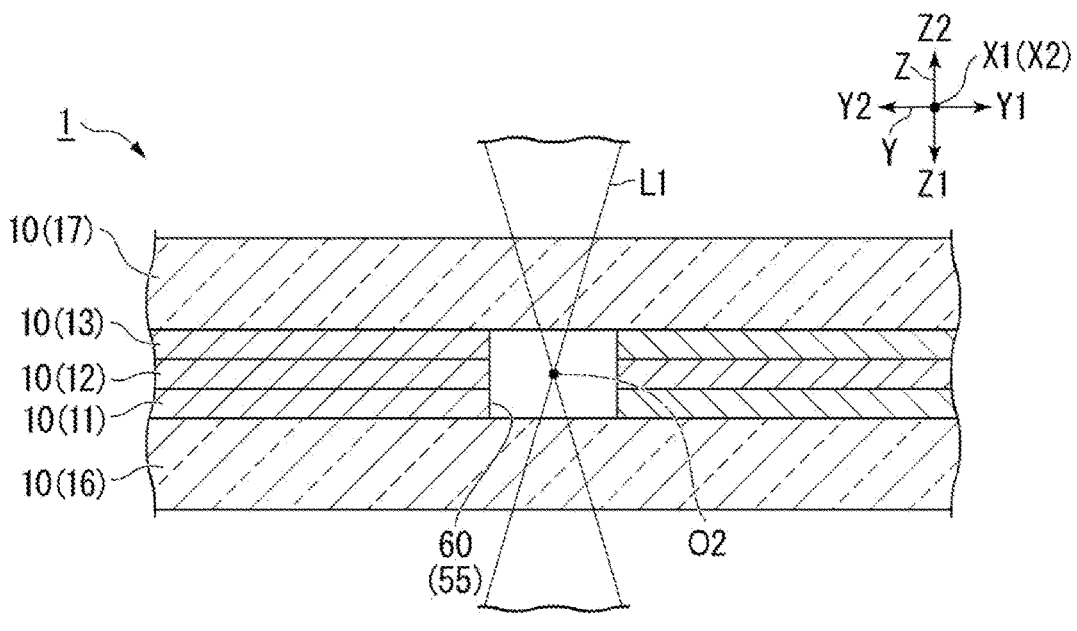
FIG. 7 is a cross-sectional view of an observation section in the observation chip.

As shown in FIG. 7, for example, the observation section 60 is formed through all the channel substrates 11, 12, and 13. The observation section 60 transmits laser light (electromagnetic waves) L1 from outside the observation chip 1 to the second channel 55. That is, the portions of the protective substrates 16 and 17 corresponding to the observation section 60 are transparent. In this example, the laser light L1 passes through the observation section 60 in the thickness direction Z. It should be noted that the protective substrate 16 may not be transparent. In this case, the observation section reflects the laser light L1 for observation. The electromagnetic waves are not limited to the laser light L1, and may also be ultraviolet light or the like.

The length L21 of the second channel 55 in the thickness direction Z is constant from the overall merging point P2 to the observation section 60.

The length of the second channel 55 in the orthogonal direction Y from the overall merging point P2 to the observation section 60 gradually decreases as it goes from the overall merging point P2 toward the downstream side X2, and then gradually decreases as it goes toward the downstream side X2. That is, the length of the second channel 55 in the orthogonal direction Y at the intermediate portion between the overall merging point P2 and the observation section 60 is shorter than the length of the second channel 55 in the orthogonal direction Y at the overall merging point P2.

It should be noted that the length of the second channel 55 in the orthogonal direction Y from the overall merging point P2 to the observation section 60 may be constant.

As shown in FIG. 1, the third channel 65 extends from the observation section 60 toward the downstream side X2 along the second axis O2. In this example, the length of the third channel 65 in the orthogonal direction Y is longer than the length L22 of the second channel 55 (observation section 60) in the orthogonal direction Y.

The separation section 70 is formed in a columnar shape. The separation section 70 is provided at an end of the third channel 65 on the downstream side X2.

For example, the second channel 55, the observation section 60, the third channel 65, and the separation section 70 are respectively formed in the channel substrate 12.

An opening 71 communicates with the separation section 70. For example, the opening 71 is formed in the channel substrate 13 and the protective substrate 17.

Next, the operation of the observation chip 1 configured as described above will be illustrated.

When using the observation chip 1, a sample fluid supply tube (not shown) is connected to the opening 21, and protective fluid tubes (not shown) are connected to the openings 36 and 51, respectively. A sample fluid supply pump (not shown) is connected to the sample fluid supply tube, and a protective fluid supply pump (not shown) is connected to the protective fluid tubes.

First, the sample fluid supply pump is driven to supply a sample fluid containing cells, such as serum, to the first channel 25 through the sample fluid supply tube and the opening 21.

Then, the protective fluid supply pump is driven to supply a protective fluid to the first branch channels 31A and 31B and the second branch channels 41 and 46 of the surrounding channel 30 through the protective fluid tubes and the openings 36 and 51. The protective fluid is, for example, water, saline, or the like.

It should be noted that the sample fluid supply pump may be driven after the protective fluid supply pump is driven, or both supply pumps may be driven simultaneously.

In FIG. 2 to FIG. 6, a white arrow B1 schematically represents the flow of the sample fluid, and a white circle C1 schematically represents the sample fluid. A gray (hatched) arrow B2 schematically represents the flow of the protective fluid through the first branch channels 31A and 31B, and a gray circle C2 schematically represents the protective fluid passing through the first branch channels 31A and 31B. A black arrow B3 schematically represents the flow of the protective fluid through the second branch channels 41 and 46, and a black circle C3 schematically represents the protective fluid passing through the second branch channels 41 and 46.

When both supply pumps continue to be driven, the sample fluid flows through the first channel 25 toward the downstream side X2, and the protective fluid flows through the first branch channels 31A and 31B and the second branch channels 41 and 46 toward the downstream side X2. As shown in FIG. 4, at the partial merging point P1 of the first channel 25, the sample fluid C1 is sandwiched from the orthogonal direction Y by the protective fluid C2 passing through the first branch channels 31A and 31B. Further, as shown in FIG. 5, as the length L18 of the first channel intermediate portion cross-sectional shape in the orthogonal direction Y is shorter than the length L15 of the partial merging point cross-sectional shape, the sample fluid C1 is confined between the protective fluid C2 at the intermediate portion between the partial merging point P1 and the overall merging point P2.

Then, as shown in FIG. 6, at the overall merging point P2, the sample fluid C1 and the protective fluid C2 are sandwiched from the thickness direction Z by the protective fluid C3 passing through the second branch channels 41 and 46.

In the observation chip 1, as described above, after the sample fluid C1 is sandwiched by the protective fluid C2 in the orthogonal direction Y, the sample fluid C1 and the protective fluid C2 are sandwiched by the protective fluid C3 in the thickness direction Z.

In this way, the protective fluids C2 and C3 surround the sample fluid C1 all around. The sample fluid C1 surrounded by the protective fluids C2 and C3 flows through the second channel 55, and is then observed using the laser light L1 in the observation section 60.

The observed sample fluid C1 and protective fluids C2 and C3 flow into the separation section 70 through the third channel 65. The sample fluid C1 and the protective fluids C2 and C3 flowing into the separation section 70 are processed as appropriate.

Here, the flow of the sample fluid C1 in the second channel 55 of the observation chip 1 will be illustrated.

Figure 8:
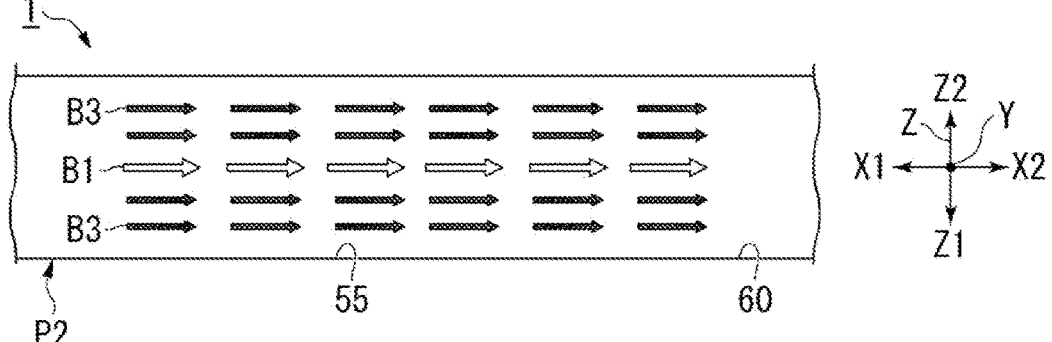
FIG. 8 is a cross-sectional view of main parts illustrating the operation of the observation chip.

As shown in FIG. 8, in the observation chip 1, the length of the second channel 55 in the thickness direction Z is constant from the overall merging point P2 to the observation section 60. Therefore, the flow of the sample fluid C1 sandwiched by the protective fluid C3 is less likely to be disturbed.

Figure 9:
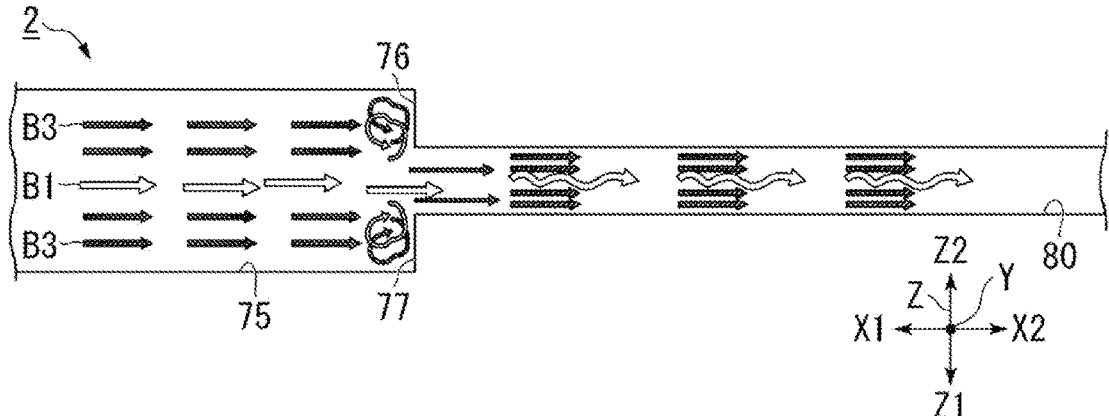
FIG. 9 is a cross-sectional view of main parts illustrating the operation of an observation chip in the related art.

In contrast, FIG. 9 shows a cross-sectional view of an observation chip 2 in the related art, such as Non-Patent Document 1. The second channel 75 of the observation chip 2 is formed with step portions 76 and 77 that narrow the channel in the thickness direction Z. Therefore, the flow of the sample fluid C1 and the protective fluid C3 is disturbed at the step portions 76 and 77, making it difficult to surround the sample fluid C1 with the protective fluids C2 and C3. Thus, it becomes difficult to observe the sample fluid C1 using the laser light L1 or the like in the observation section 80.

Next, a simulation result of the flow of the sample fluid C1 in the second channel 55 of the observation chip 1 will be illustrated.

Figure 10:
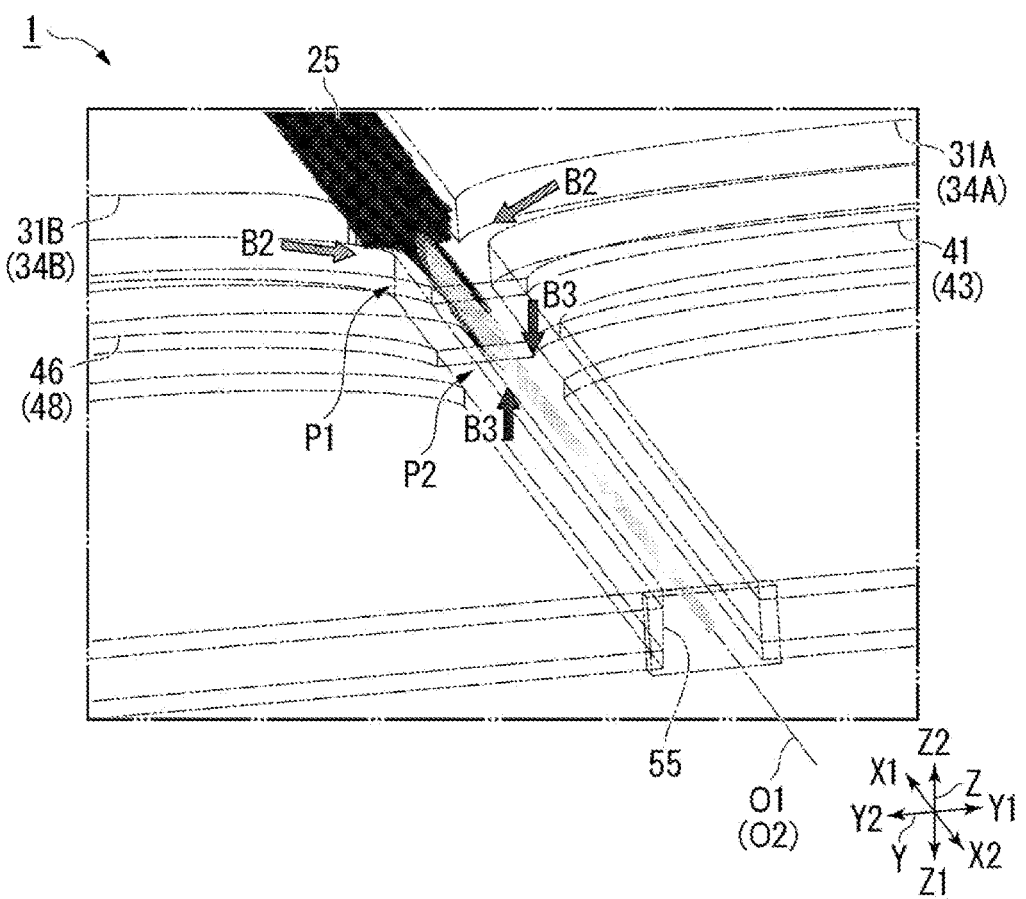
FIG. 10 is a perspective view illustrating a simulation result of the observation chip.

As shown in FIG. 10, it can be seen that the flow of the sample fluid C1 surrounded by the protective fluids C2 and C3 is stable without disturbance along the second axis O2 in the second channel 55.

As illustrated above, in the observation chip 1 of this embodiment, the sample fluid C1 flows from the first channel 25 toward the overall merging point P2, and the protective fluids C2 and C3 flow from the surrounding channel 30 toward the overall merging point P2. At this time, the sample fluid C1 is surrounded by the protective fluids C2 and C3 all around in the cross section S2. Since the length of the second channel 55 in the thickness direction Z is constant from the overall merging point P2 to the observation section 60, the flow of the sample fluid C1 and the protective fluids C2 and C3 is not disturbed. Thus, the observation chip 1 is configured to stabilize the sample fluid C1 for observation in the observation section 60.

The surrounding channel 30 includes the first branch channels 31A and 31B and the second branch channels 41 and 46. Therefore, the sample fluid C1 may be sandwiched at once from the orthogonal direction Y by the protective fluid C2 flowing through the first branch channels 31A and 31B, and the sample fluid C1 and the protective fluid C2 may be sandwiched at once from the thickness direction Z by the protective fluid C3 flowing through the second branch channels 41 and 46. The first branch channels 31A and 31B are plane symmetrical with respect to the reference plane S1. Therefore, the sample fluid C1 may be stably sandwiched by the protective fluid C2 flowing through the first branch channels 31A and 31B.

The second branch channels 41 and 46 may be plane symmetrical with respect to the reference plane S1. In this case, the sample fluid C1 may be stably sandwiched by the protective fluid C3 flowing through the second branch channels 41 and 46.

The length L18 of the first channel 25 and the first branch channels 31A and 31B in the orthogonal direction Y at the intermediate portion between the partial merging point P1 and the overall merging point P2 is shorter than the length L15 of the first channel 25 and the first branch channels 31A and 31B in the orthogonal direction Y at the partial merging point P1. Thereby, the sample fluid C1 flowing through the first channel 25 may be more reliably confined between the protective fluid C2 flowing through the first branch channels 31A and 31B.

The length of the second channel 55 in the orthogonal direction Y at the intermediate portion between the overall merging point P2 and the observation section 60 is shorter than the length L22 of the second channel 55 in the orthogonal direction Y at the overall merging point P2. Therefore, the performance of confining the sample fluid C1 with the protective fluids C2 and C3 as a whole may be improved.

Figure 11:
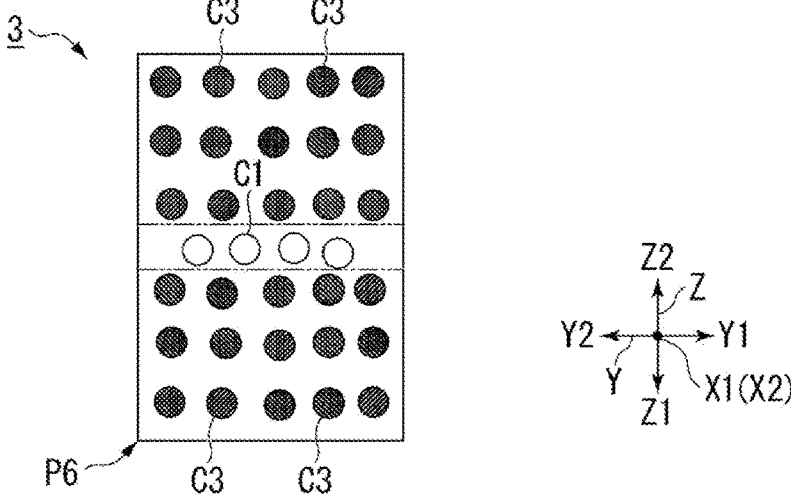
FIG. 11 is a cross-sectional view of main parts illustrating the operation of an observation chip in a modified example of an embodiment of the present disclosure.
Figure 12:
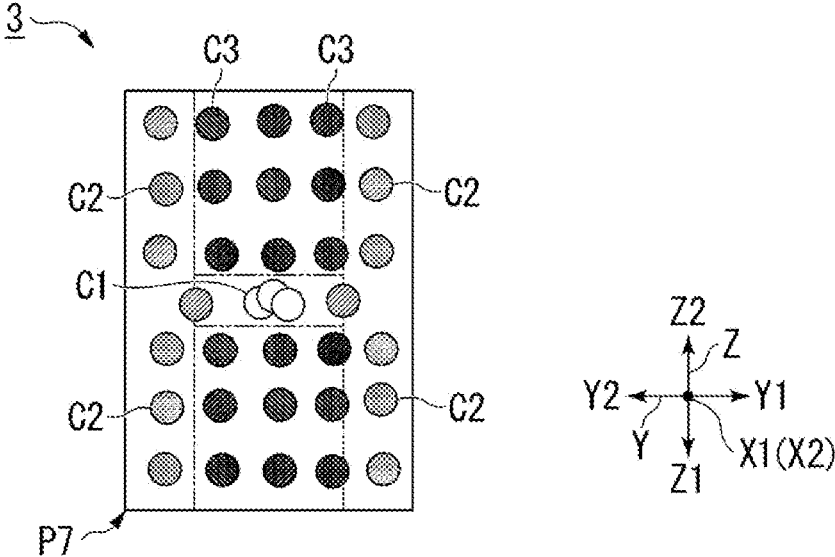
FIG. 12 is a cross-sectional view of main parts illustrating the operation of the observation chip.

It should be noted that an observation chip 3 according to a modified example may be configured as shown in FIG. 11 and FIG. 12. In the observation chip 3, as shown in FIG. 11, the sample fluid C1 is sandwiched by the protective fluid C3 from the thickness direction Z at a partial merging point P6. Thereafter, as shown in FIG. 12, the sample fluid C1 and the protective fluid C3 are sandwiched by the protective fluid C2 from the orthogonal direction Y at an overall merging point P7.

The observation chip 3 of the modified example is configured to achieve the same effects as the observation chip 1 of this embodiment.

An embodiment of the present disclosure has been described in detail above with reference to the drawings, but the specific configuration is not limited to this embodiment, and the present disclosure includes modifications, combinations, deletions, etc. of the configuration without departing from the gist of the present disclosure.

For example, in the above embodiment, the first branch channels 31A and 31B are not necessarily plane symmetrical with respect to the reference plane S1.

It should be noted that a sorting device for sorting cells, for example, also needs to have a structure in which particles stably flow at a fixed position in the channel in a cross section orthogonal to the channel, as used in this embodiment.

What is claimed is:

1. An observation chip, comprising:

a plurality of substrates stacked in a thickness direction of the plurality of substrates;

a first channel extending along a first axis along the plurality of substrates;

a surrounding channel surrounding the first channel all around in a cross section orthogonal to the first axis in the first channel from an end of the first channel to an overall merging point of the first channel, integrated with the first channel, and forming a second channel that extends along a second axis along the plurality of substrates; and an observation section provided on a side farther away from the first channel than the overall merging point in the second channel, and transmitting electromagnetic waves from outside to the second channel, wherein a length of the second channel in the thickness direction is constant from the overall merging point to the observation section.

2. The observation chip according to claim 1, wherein the surrounding channel comprises:

a pair of first branch channels sandwiching the first channel in a first orthogonal direction, respectively orthogonal to the first axis and the thickness direction, at a partial merging point located on a side farther away from the second channel than the overall merging point in the first channel; and a pair of second branch channels sandwiching the first channel in the thickness direction at the overall merging point of the first channel.

3. The observation chip according to claim 2, wherein the pair of first branch channels are plane symmetrical with respect to a reference plane that includes the first axis and extends along the thickness direction.

4. The observation chip according to claim 2, wherein the pair of second branch channels are plane symmetrical with respect to a reference plane that includes the first axis and extends along the thickness direction.

5. The observation chip according to claim 2, wherein a length of the first channel and the pair of first branch channels in the first orthogonal direction at an intermediate portion between the partial merging point and the overall merging point is shorter than a length of the first channel and the pair of first branch channels in the first orthogonal direction at the partial merging point.

6. The observation chip according to claim 1, wherein a length of the second channel in a second orthogonal direction, respectively orthogonal to the second axis and the thickness direction, at an intermediate portion between the overall merging point and the observation section is shorter than a length of the second channel in the second orthogonal direction at the overall merging point.

* * * * *